United States Patent [19]

Ito

[11] Patent Number: 4,622,872
[45] Date of Patent: Nov. 18, 1986

[54] LATHE
[75] Inventor: Chihiro Ito, Gifu, Japan
[73] Assignee: Murata Kikai Kabushiki Kaisha, Japan
[21] Appl. No.: 617,758
[22] Filed: Jun. 6, 1984

[30] Foreign Application Priority Data

| Jun. 8, 1983 | [JP] | Japan | 58-88295[U] |
| Jun. 8, 1983 | [JP] | Japan | 58-88296[U] |
| Jun. 8, 1983 | [JP] | Japan | 58-88297[U] |
| Jun. 14, 1983 | [JP] | Japan | 58-91767[U] |

[51] Int. Cl.$^4$ ............................ B23B 3/06; B23B 9/10
[52] U.S. Cl. ........................................ 82/2 R; 82/3; 82/32; 82/36 A
[58] Field of Search ............... 82/2 R, 32, 36 A, 24 R, 82/3

[56] References Cited
U.S. PATENT DOCUMENTS

| 3,387,515 | 6/1968 | George | 82/2 R |
| 3,786,539 | 1/1974 | Foll et al. | 82/2 R |
| 4,040,316 | 8/1977 | Gramespacher et al. | 82/32 |
| 4,177,700 | 12/1979 | van der Horst | 82/2 R |
| 4,413,539 | 11/1983 | Ishizuka et al. | 82/2 R |
| 4,478,117 | 10/1984 | Brown et al. | 82/32 |

OTHER PUBLICATIONS

Machinery and Production Engr., Sep. 2, 1970, pp. 383, 384, FIG. 33, "*Monforts* Type MNC 300NC Automatic Lathe.

Primary Examiner—Leonidas Vlachos
Attorney, Agent, or Firm—Spensley Horn Jubas & Lubitz

[57] ABSTRACT

A lathe having no sliding bed. A cross slide is slidably arranged on a first guide cylinder mounted in a lathe bed, a second guide cylinder crossing at a right angle with the first guide cylinder is arranged on the cross slide, a slide shaft sliding along the second guide cylinder is arranged, and a tool rest is fixed at the extremity end of the slide shaft.

6 Claims, 12 Drawing Figures

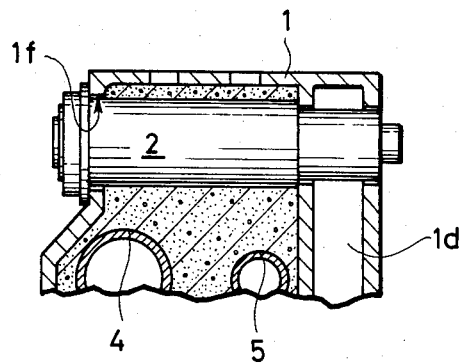
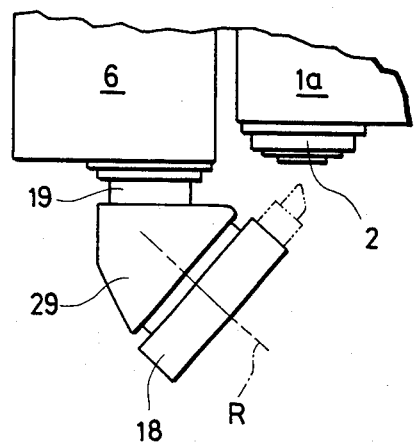
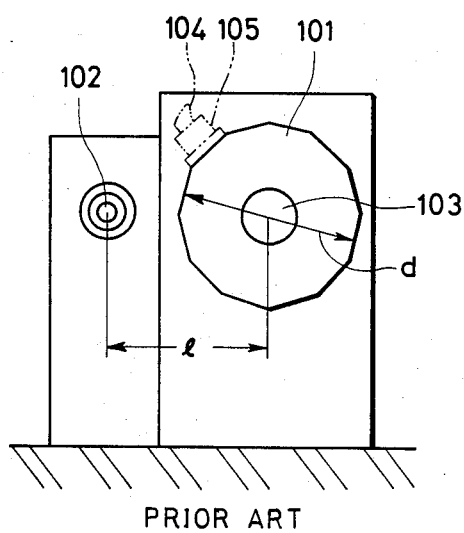

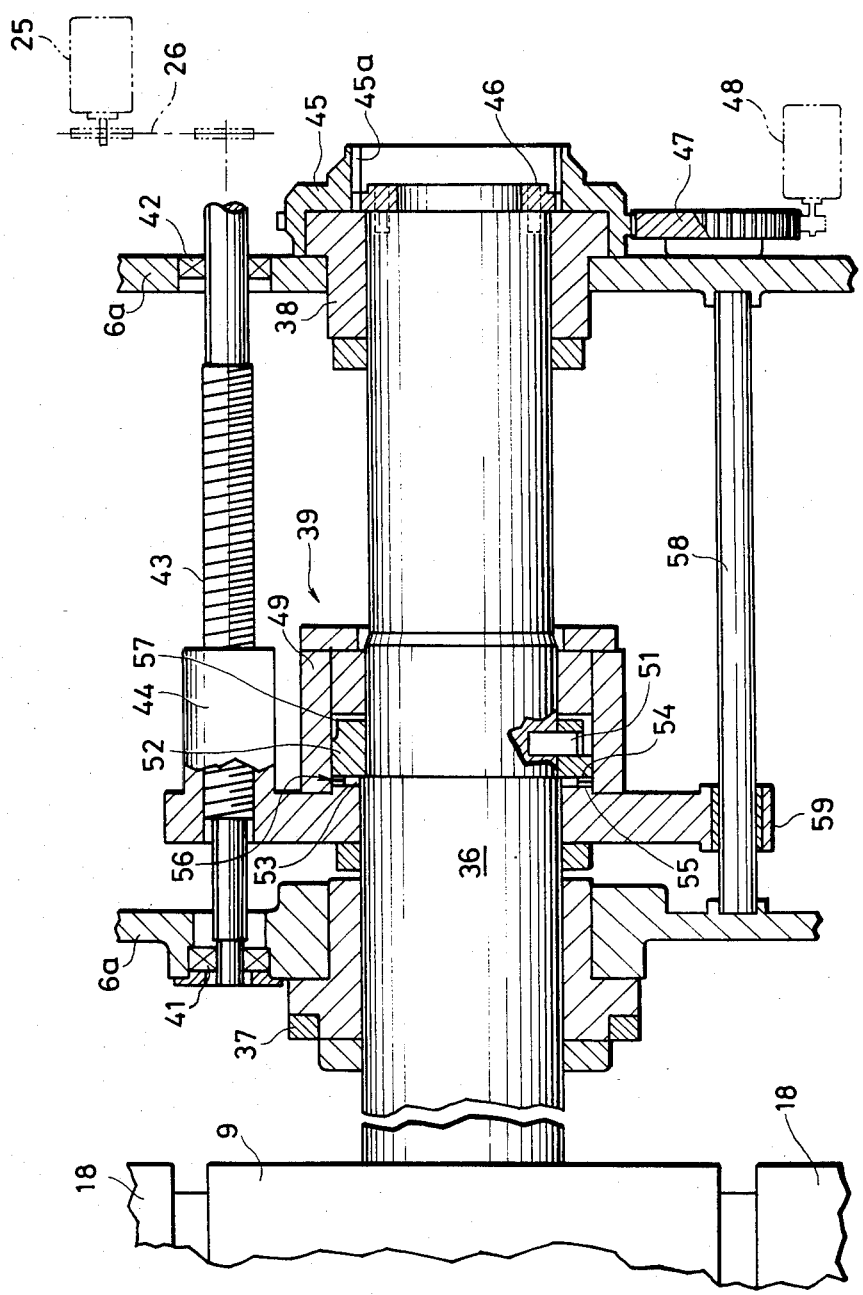

LATHE

BACKGROUND OF THE INVENTION

1. Field of the Invention

This invention relates to a supporting structure for a tool rest applied in a lathe.

2. Prior Art

A lathe in which capstan rests are movably arranged on a sliding bed has some disadvantages that if the capstan rests are made to be approchable to main shafts, the sliding bed should be laterally installed at the front of and just below the main shafts, and in this case, the cut chips are prevented by the sliding bed from being dropped to cause a poor rate of recovery of the cut chips and a special cover device is required such as a bellows in order to prevent the cut chips from being advanced into the fine finished corrugated sliding surfaces of the sliding bed and damaging the sliding surfaces. Further, the lathe in which a sliding bed is applied to cause the capstan rests to be movable has fundamentally a disadvantage that it has an expensive manufacturing cost for the sliding bed and its adjustment during its assembling operation is hard to perform and is of a trouble-some operation.

A lathe in which capstan rests are arranged at the extremity ends of the capstan shafts in parallel with the main shafts is already known and this type of lathe has the following disadvantages.

That is, the disadvantages found in this type of lathe are consisted in that a distance between the capstan shafts and the main shafts should be spaced apart substantially in respect to a driving system, and in order to cause a tool to be approached to the main shafts with the spaced-apart distance being accommodated, either a diameter of the capstan is made large or the capstan rests should be of a long leg type, and in the former case, though it has an advantage that number of tools capable of being installed is increased, the weight of capstan is increased more than a proportion of two times of the increased diameter and a capstan indexing speed is substantially decreased as an outer circumferential distance is increased or as a source of power for driving or rotating the capstan, one with a high horse power is needed and in turn in the latter case, a high bucking load is applied to the tool rest to cause an accident of damage to occur.

SUMMARY OF THE INVENTION

It is an object of the present invention to provide a lathe in which a wide space is found at the front of and below the main shafts, a smooth dropping of cut chips is performed, a manufacturing cost is less expensive and its assembling is quite simple.

It is a still further object of the present invention to provide a lathe in which capstan rests are arranged at the capstan shafts which are parallel with the main shafts, and several tools can be mounted and a decreasing of indexing speed of the capstans is not found.

It is still further object of the present invention to provide a supporting structure for a tool rest to cause a horse power of a driving source to be decreased.

It is yet still further object of the present invention to provide a lathe in which the number of manufacturing steps is saved, manufacturing work is simplified and a high rigidity is made upon completion of the lathe.

In the lathe constructed in accordance with the present invention, cross slides are slidably arranged on the first guide cylinders mounted in a lathe bed, the second guide cylinders crossing at a right angle with the first guide cylinders are arranged on the cross slides, slide shafts sliding along the second guide cylinders are arranged, tool rests are fixed at the extremity ends of the slide shafts, and no sliding beds are arranged.

Further, in accordance with the present invention, the main shafts of the slide shafts, tool rests at the extremity ends of the slide shafts are of a capstan rest, rotary shafts for the capstan rests are arranged to cross with the axes of the slide shafts, resulting in that the diameter of a capstan can be reduced and thus a capstan indexing speed can be increased and a workpiece machining time can be reduced.

Since the guide shafts of the present invention are of a structure in which both ends are supported by the supporting members of which positions can be adjusted in respect to the lathe bed, it is possible to make a simple adjustment of the position and inclination of the guide shafts and so the number of steps of assembling operation are decreased.

BRIEF DESCRIPTION OF THE DRAWINGS

FIG. 6 is a partial section for showing one of means for fixing a guide shaft to a lathe bed;

FIG. 7 is a partial top plan view for showing one practical example in which a capstan rest is fixed;

FIG. 11 is a developed sectional view for showing an inner part of a cross slide of a lathe illustrated in FIG. 8; and FIG. 12 is a schematic front elevational view for showing a prior art lathe.

DETAILED DESCRIPTION OF THE INVENTION

Referring now to the accompanying drawings, some preferred embodiments of the present invention will be described in detail.

Figure 1:
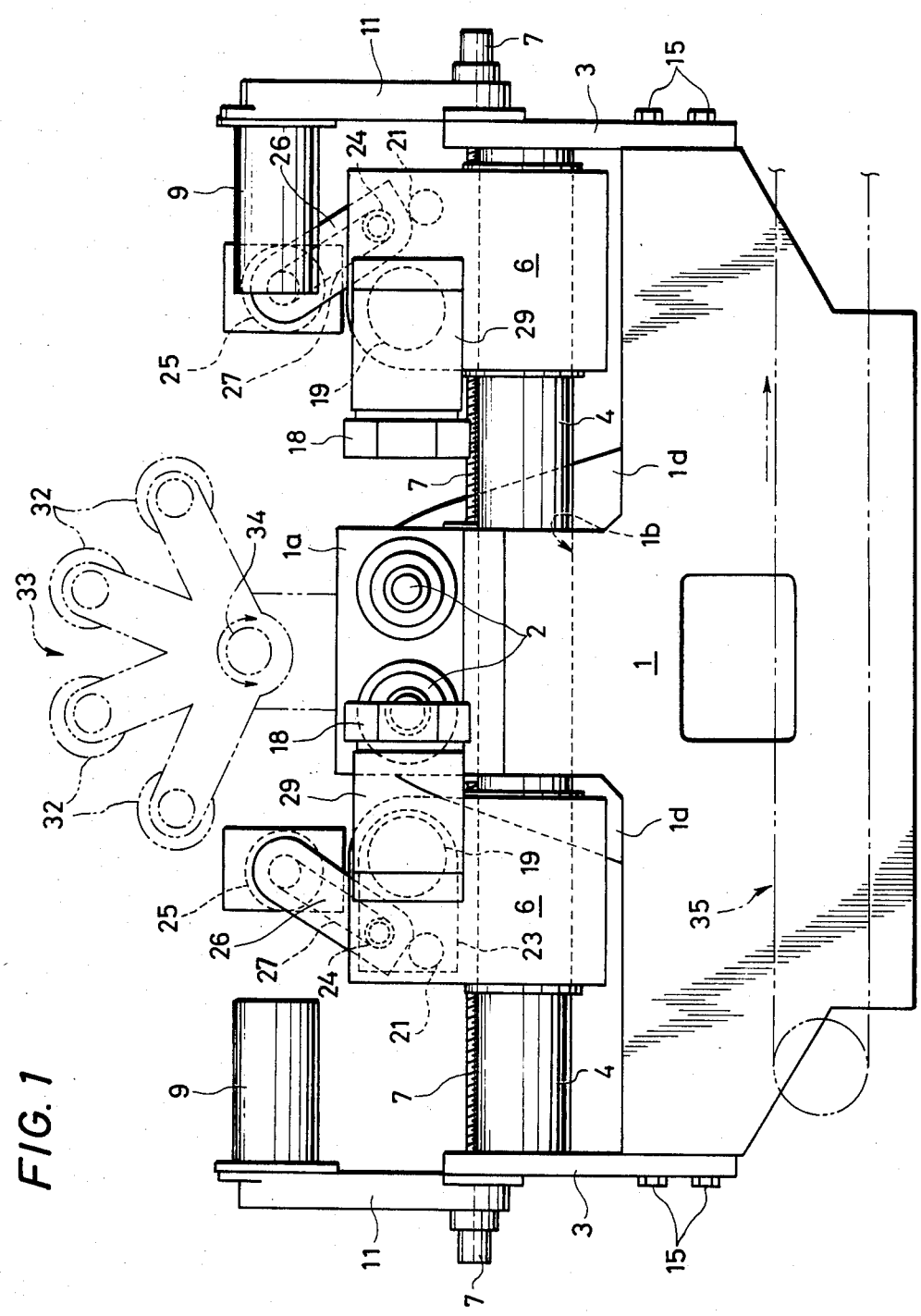
FIG. 1 is a front elevational view for showing a first preferred embodiment of a lathe constructed in accordance with the present invention.
Figure 2:
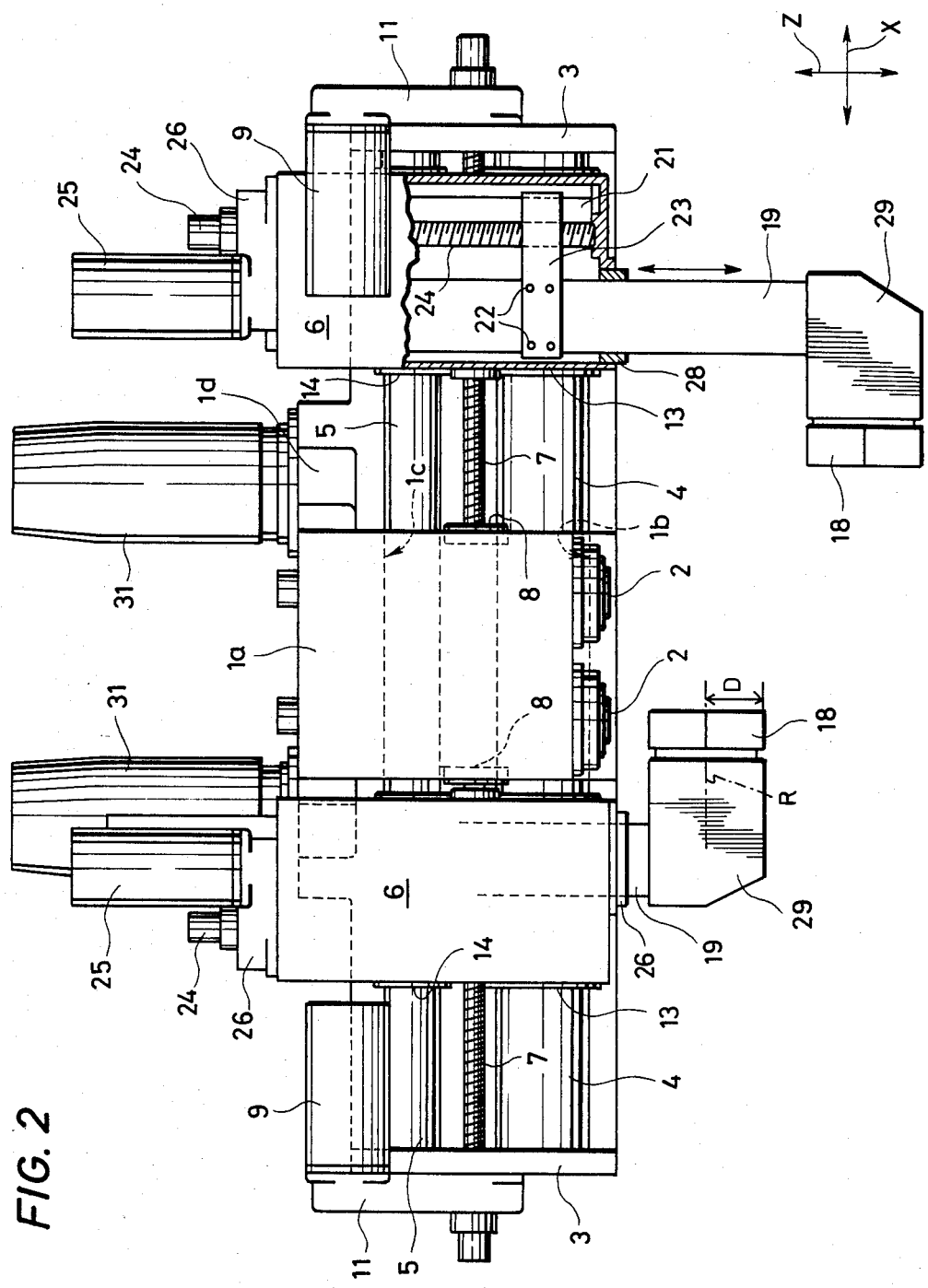
FIG. 2 is a top plan view for showing a lathe illustrated in FIG. 1.
Figure 3:
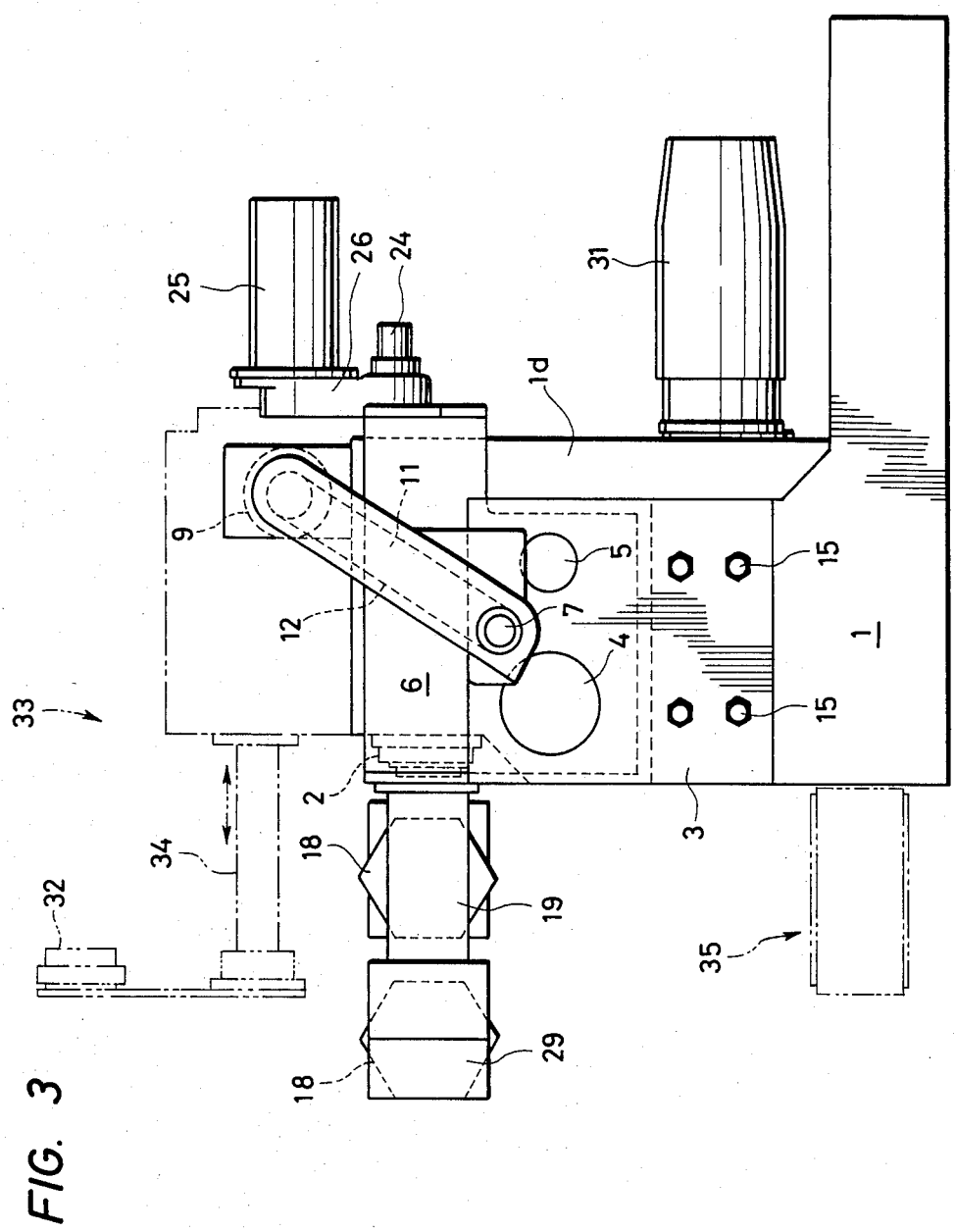
FIG. 3 is a right side elevational view for showing a lathe illustrated in FIG. 1.

In FIGS. 1 to 3, 1 indicates a lathe bed in which a head stock 1a for a main shaft 2 is continuously casted at a central part of the lathe bed, supporting plates 3 are fixed at the right and left ends of the lathe bed 1, two through-pass openings 1b, 1c are provided below the head stock 1a, and two longitudinal cylindrical guide shafts 4, 5 are extended through the through-pass openings 1b, 1c and their both ends are fixed to the supporting plates 3.

Cross slides 6 are slidably supported on the guide shafts 4, 5 and passed thereonto, arranged between the supporting plates 3 and the head stock 1a and then moved in a rightward or a leftward direction under a rotation of a ball screw 7 threadably engaged with a female threads not shown in the cross slides 6. Reference numeral 8 indicates a bearing at each of the ends of respective ball screws, 9 indicates a servo motor for rotating each of the ball screws which is arranged on the supporting plate 3, and 11 indicates a supporting frame for the servo motor 9 which is also provided for making a casing for both a sprocket and a chain 12 for use in cooperatively connecting the servo motor 9 to the ball screw 7. Bearings 13, 14 for each of the guide shafts 4, 5 arranged at the wall of the cross slide 6 are a static pressure bearing in this example and they are made such that the cross slides 6 can be moved under a quite low frictional resistance and the guide shafts 4, 5 show a minimum friction.

The supporting plates 3 at both ends of the guide shafts 4, 5 are adjustably arranged at their fixed positions in respect to the lathe bed 1, respectively, and they may be positively fixed to the lathe bed 1 with bolts 15 etc. or weldings at their desired positions after their adjustment.

Figure 4:
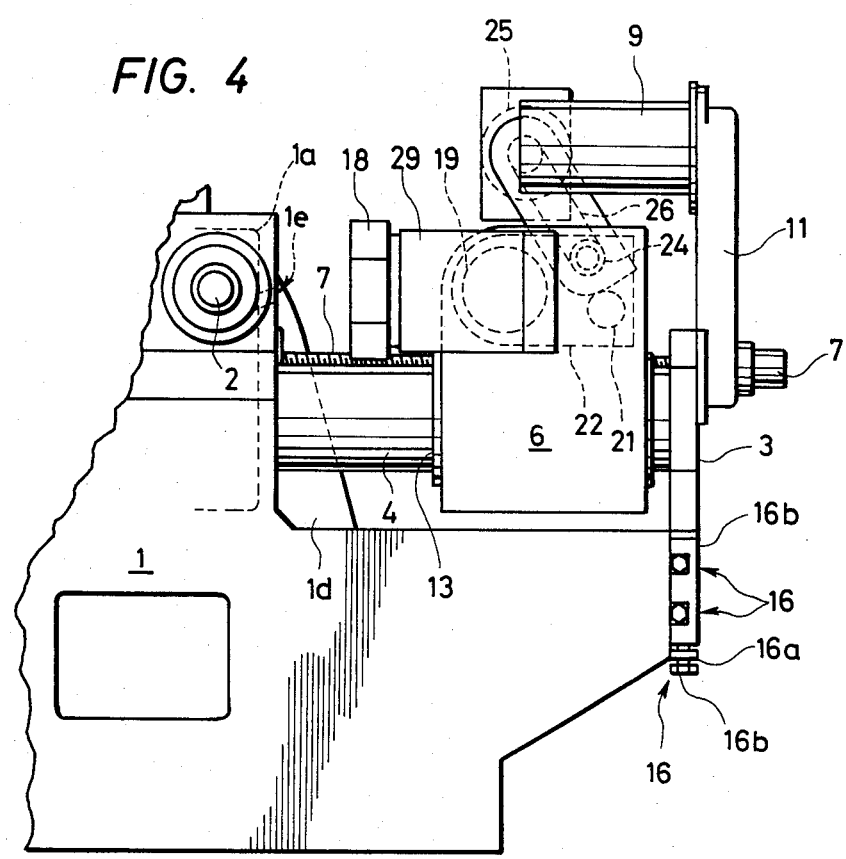
FIG. 4 is a front elevational view partly broken away for showing a second preferred embodiment of a lathe.
Figure 5:
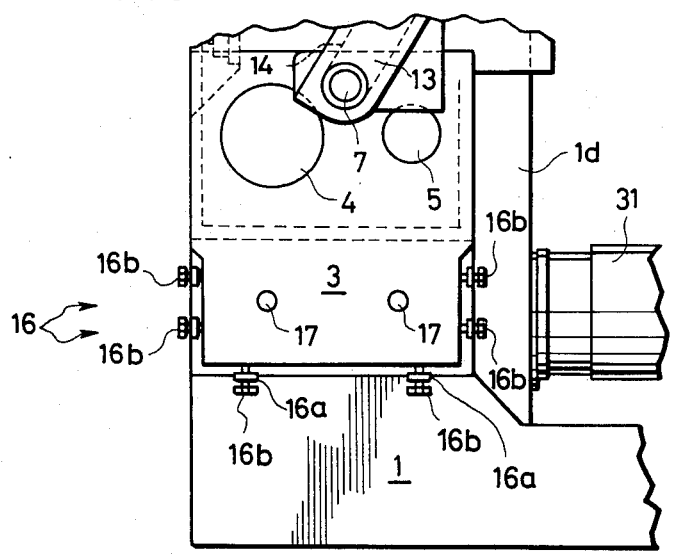
FIG. 5 is a right side elevational view partly broken away for showing a lathe illustrated in FIG. 4.

That is, as shown in FIGS. 4 to 6, if each of the through-pass openings 1b, 1c provided below the head stock 1a of the lathe bed 1 is made slightly larger than the diameter of each of the guide shafts 4, 5, the supporting plate 3 can temporarily be fixed on position adjusting jigs 16 composed of a nut plate 16a projected from the lathe bed 1 and of a bolt 16b by fastening the bolt 16b, each of the position adjusting jigs 16 can be adjusted and the guide shafts 4, 5 arranged over the supporting plate 3 can easily be installed at a proper height and along a correct horizontal plane.

As described above, if a proper fixing position of the supporting plate 3 in respect to the lathe bed 1 is defined, a position fixing pin 17 passing through the supporting plate 3 and projecting into the lathe bed 1 is struck into the lathe and at the same time a well-known resin concrete is poured into a closed space in the lathe bed 1 at another opening 1e in the side surface of the head stock 1a of the lathe bed 1 and then the passing-through guide shafts 4, 5 are fixed to the lathe bed 1. During this operation, clearances between the through-pass openings 1b, 1c and the guide shafts 4, 5 are closed in advance with suitable seal material.

When the resin concrete is solidified and the guide shafts 4, 5 are positively fixed in respect to the lathe bed 1, the position fixing pin 17 is pulled out, the supporting plates 3 are removed at once, both ends of the guide shafts 4, 5 are released and then cross slides 6 which have already been assembled are inserted onto the guide shafts 4, 5 at the sides thereof. After insertion of the cross slides 6, the supporting plates 3 are fitted again at both ends of the guide shaft 4, 5 and welded or fastened by bolts 15 in respect to the lathe bed 1.

Assembling of the main shafts 2 to the lathe bed 1 is performed such that, similar to the assembling of guide shafts 4, 5 to the lathe bed 1, through-pass openings 1f for the main shafts made at the front and rear surfaces of the lathe bed 1 are made slightly larger than the diameters of the main shafts 2 to be inserted, and the inserted main shafts 2 are of a cylindrical unit, the main shafts 2 of the unit are inserted into the through-pass openings 1f, the main shafts 2 are adjusted at a proper position and in a proper attitude in respect to the lathe bed 1 with jigs similar to the position adjusting jigs 16, thereafter resin concrete similar to the above is poured into the closed spaces around the main shafts in the lathe bed 1.

As described above, in case that the fixing of the guide shafts 4, 5 and main shafts 2 to the lathe bed 1 is performed by filling hardening agent such as resin concrete etc., their assembling step is simplified and a lathe having a low vibration during its operation can be provided due to a better periodic damping of concrete.

With the foregoing, the assembling of cross slides 6 and main shafts 2 to the lathe bed 1 can be performed and when the servo motors 9 are rotated in a proper direction by a proper number of rotation, the cross slides 6 are moved in a rightward or a leftward direction and stopped at a desired position. The capstan rests 18 are mounted on the cross slides 6 in such a way as described below.

That is, the cross slides 6 are of a box-like shape, and cylindrical slide shafts 19 passing longitudinally through the cross slides 6 and crossing at a right angle with the guide shafts 4, 5 are slidably supported at the upper parts of the cross slides so as to fix and support the cylindrical guide shafts 21 which are in parallel with the slide shafts 19. The through-pass holes of the connecting plates 23 fixed at 22 and connected to the slide shafts 19 are inserted onto the guide shafts 21, ball screws 24 which are in parallel with the slide shafts 19 and the guide shafts 21 are threadably engaged with the inner threaded holes formed in the connector plates 23. When servo motors 25 supported on the cross slides 6 are rotated, the ball screws 24 are rotated to cause the slide shafts 19 to be longitudinally slid without any rotation thereof through the connector plates 23.

26 indicates a supporting frame which may also act as a casing, similar to the supporting frames 11, for a sprocket and a chain 27 cooperatively coupling the servo motor 25 with the end of ball screw 24. The bearings 28 for the slide shafts 19 are of a static pressure bearing, similar to the bearings 13, 14, and the slide shafts 19 are moved with a quite low frictional resistance and also with a minimum friction.

And the capstan rests 18 are fixed at the extremity ends of the slide shafts 19 supported in such a way as above, through mounting blocks 29. The capstan rests 18 are of a type in which a disk is driven to rotate under a hydraulic pressure, wherein they are supplied with and driven by hydraulic pressure through hydraulic lines arranged in the slide shafts 19.

31 indicate motors for rotating and driving the main shafts, 1d show casings at the lathe bed 1 having belts and a pullys not shown for use in connecting the motors 31 to the main shafts 2. On the head stock 1a can be installed a loader 33 which has four chucks 32 shown by a dotted line and which can be swivelled and moved in a forward or rearward direction so as to perform a simultaneous loading and unloading of a workpiece for each of the main shafts 2 which the chucks 32. 34 indicates a rotatable supporting shaft which can also be moved in a longitudinal direction for the loader 33.

The lathe constructed in accordance with the first preferred embodiment is made as above, wherein as the servo motors 9 are rotated, the cross slides 6 are moved in parallel along the guide shafts 4, 5 in a rightward or leftward direction (indicated by X in the figure), and as the servo motors 25 are rotated, the slide shafts 19 are longitudinally moved (in a direction indicated by Z in the figure) on the cross slides 6 along the guide shafts 21, the capstan rests 18 are freely moved in a plane containing the main shafts 2 and moved to and away from the main shafts 2. No objects such as a bed for use in mounting the capstan rests are found at the forward and lower part of the main shafts 2, the cut chips are directly dropped down and thus a conveyor 35 schematically shown by a dotted line for use in discharging the cut chips can be installed to perform a high efficient recovery of cut chips.

Since the guide shafts 4, 5 and 21 and the slide shafts 19 are cylindrical, it is quite easy to provide a precise manufacturing of the shafts 4, 5, 21 and 19. The bearings 13, 14 and 28 can also be made precisely, therefore a quite precise and smooth movement of the capstan rests 18 fixed at the ends of the slide shafts 19 can be facilitated in a plane. Application of static pressure bearing to the bearings 13, 14 and 28 causes a smooth movement to be increased more.

Further, even if a large distance L is found between the capstan rest 18 and the shaft 19 at a position where the shaft 19 for supporting the capstan rest 18 is approached most closely to the main shaft 2, it is not necessary to fix a capstan having a large diameter which is substantially equal to the spaced-apart distance L due to the fact that the capstan rests 18 are fixed through the mounting blocks 29 so as to face laterally in respect to the shafts 19. Further, even if the capstan rests 18 having a small diameter D as shown are arranged, cutter edges are sufficiently reached to the main shafts 2 to enable workpieces held at the main shafts 2 to be machined and thus a high indexing speed of the capstan can be obtained.

In the above preferred embodiment, the capstan rotating axis R is crossed at a right angle with the shaft 19 in particular, so that the diameter of the capstan rest 18 is made as small as possible in a range where a required tool can be mounted. However, also in the case that the rotating axis R is crossed at another angle with the shaft 19, for example, as shown in FIG. 7, a sufficient small capstan diameter is applied in comparison with that of the prior art shown in FIG. 12 where the capstan rotating axis R is arranged in parallel with the shaft 19.

Further, in the preferred embodiment above, since both ends of the guide shafts 4, 5 are fixed and supported at the supporting plates 3 of which position can be adjusted, it is easy to adjust the height and inclination of the guide shafts 4, 5 and no hard adjustment found in case of assembling of the sliding bed is occured, each of the guide shafts 4, 5 is of a longitudinal cylinder passing through the head stock 1a and both cross slides 6 with the main shafts 2 held therebetween are installed at the guide shafts 4, 5, so that a simultaneous adjustment of both cross slides 6 can be performed and the number of assembling steps can be substantially eliminated.

Then, the second preferred embodiment in which a plurality of capstan rests are mounted at the extremity ends of the slide shafts will be described.

Figure 8:
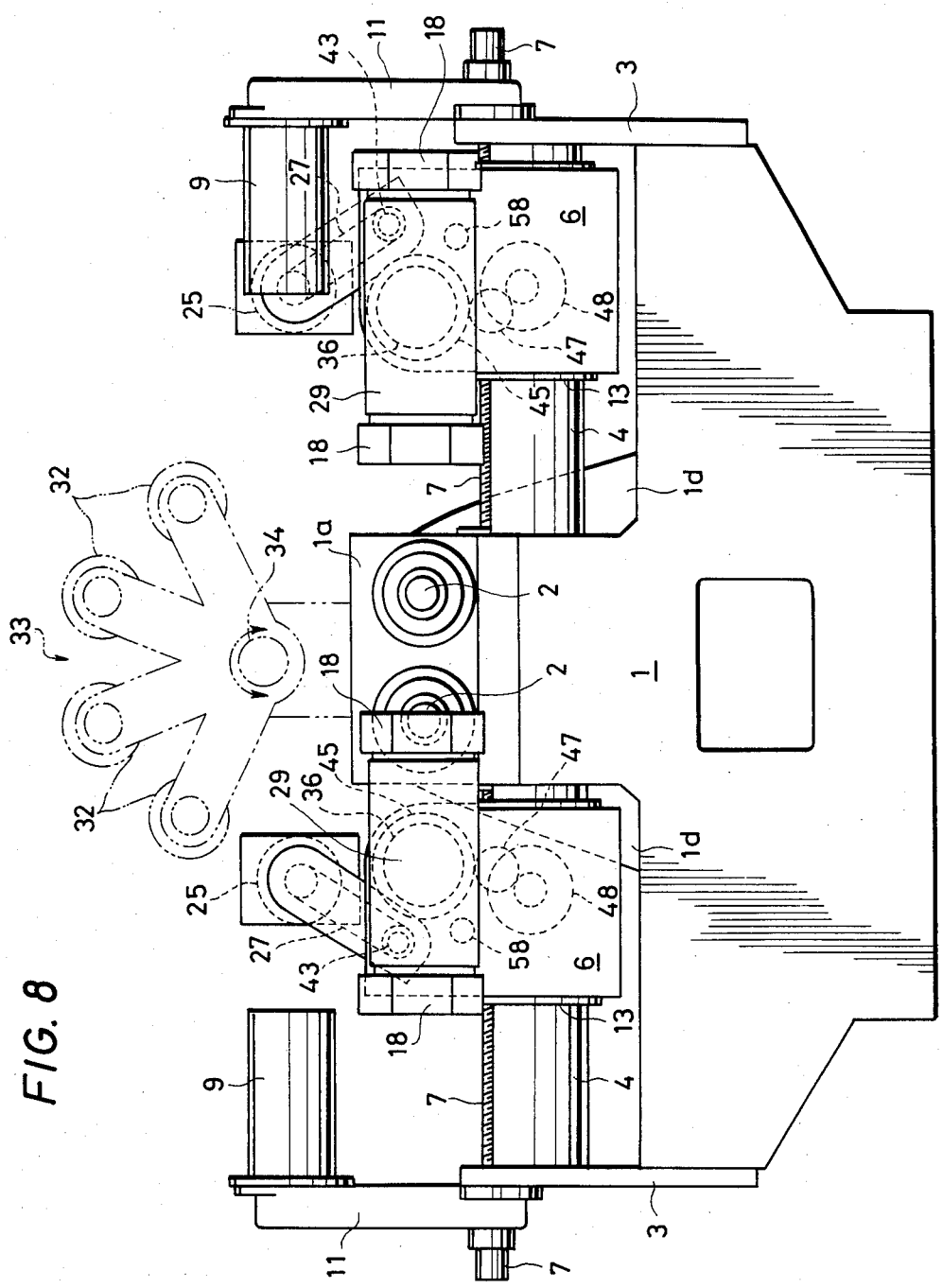
FIG. 8 is a front elevational view for showing a third preferred embodiment of a lathe constructed in accordance with the present invention.
Figure 9:
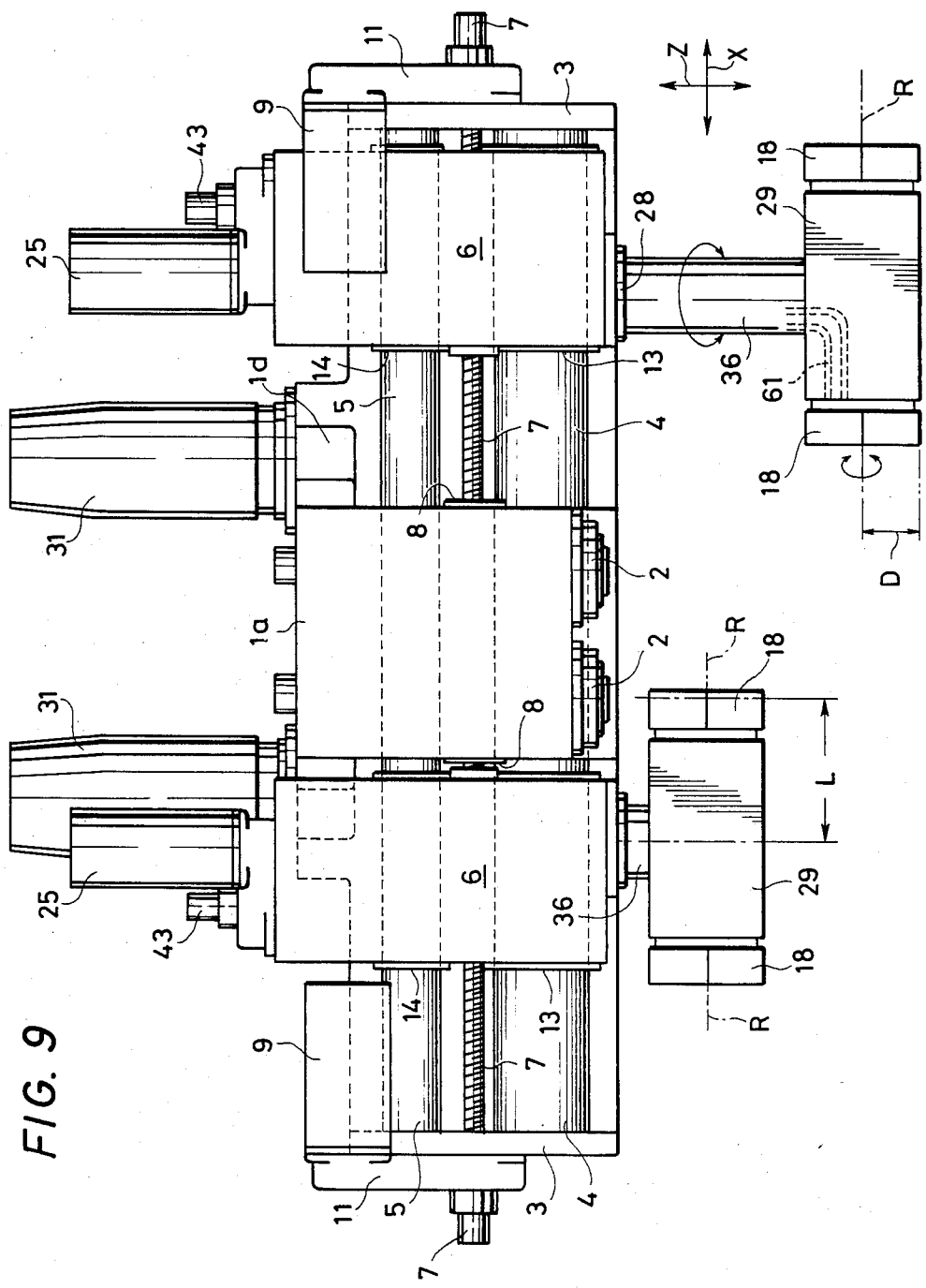
FIG. 9 is a top plan view for showing a lathe illustrated in FIG. 8.
Figure 10:
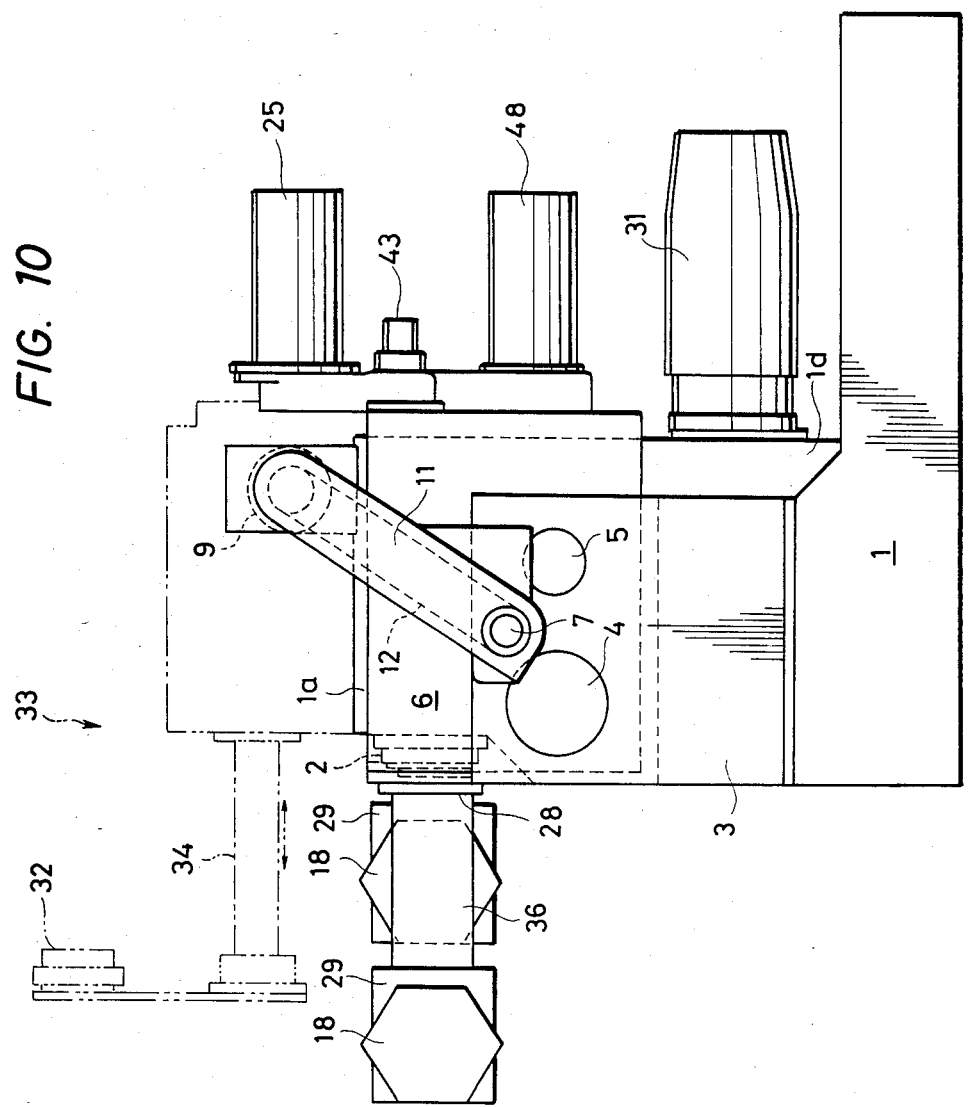
FIG. 10 is a right side elevational view for showing a lathe illustrated in FIG. 8.

That is, as shown in FIG. 8 and its subsequent figures, the lathe constructed in accordance with the second preferred embodiment has a lathe bed 1, guide shafts 4, 5, supporting plates 3 and supporting structure of the guide shafts 4, 5 for cross slides 6 which are the same as those shown in the lathe of the first preferred embodiment (similar structural parts are indicated by the same corresponding reference numerals). When the servo motors 9 placed on the supporting plates 3 are rotated in a suitable direction at a proper number of rotation, the cross slides 6 are moved along the guide shafts 4, 5 and stopped at the desired position. Capstan shafts 36 are placed on the cross slides 6 in such a way as described below.

That is, as shown in FIG. 11, the capstan shaft 36 passing longitudinally through the cross slide 6 is rotatably and slidably supported at the bearings 37, 38 at the upper part of the casing 6a of the cross slide 6. The capstan shaft 36 is threadably engaged with a ball screw 43 supported at the bearings 41, 42 in the cross slide 6 through a connecting block 39 of which connected condition is selectively engaged or disengaged. When the ball screw 43 is rotated by a servo motor 25 on the cross slide 6 through a chain 26 and a sprocket, the capstan shaft is moved longitudinally, i.e. axially along with the connection block 39. Reference numeral 44 indicates an inner threaded part which is integrally formed with the connection block 39.

Around the bearing 38 far the capstan shaft 36 is arranged an annular gear 45 of large diameter formed with an inner gear 45a at its inner circumference. Under the condition shown in FIG. 11 where the capstan shaft 36 is moved forward with the rotation of the ball screw 43, a gear 46 fixed at the rear end of the capstan shaft 36 is engaged with the inner gear 45a and when the gear 45 is rotated by an indexing servo motor 48 through an intermediate gear 47, the capstan shaft 36 is rotated by the desired angled so as to be indexed. The rotation applied for an indexing operation is allowed under a condition in which the engaging or disengaging means in the connection block 39a is disengaged, and in turn under a condition in which the engaging or disengaging means is engaged, the indexing rotation is impossible and the capstan shaft 36 is rigidly fixed to the connection block 39.

That is, a casing 49a around the capstan shaft 36 of the connection block 39 is of a cylinder, an annular piston 52 fixed at 51 to the capstan shaft 36 is installed in the casing 49 in such a way as it may be moved slightly in a longitudinal direction. When a hydraulic oil is supplied to a chamber 53 in front of the piston 52, the capstan shaft 36 is slightly moved rearwardly in respect to the connection block 39, a well-known coupling 56 composed of annular teeth 54 formed at the front surface of the piston 52 and annular teeth 55 formed at the connection block is disengaged, the capstan shaft 36 is made rotatable in respect to the connection block 39 and in turn when a hydraulic oil is supplied to a chamber 57 formed at a rearward part of the piston 52, the capstan shaft 36 is moved slightly in a forward direction in respect to the connection block 39, the coupling 56 is engaged to cause the capstan shaft 36 to be rigidly fixed to the connection block 39.

Reference numeral 58 indicates a guide shaft arranged in the cross slide 6 which passes through one end 59 of the connection block 39 so as to make a guide for the connection block 39 as well as to provide stop means against the rotation of connection block.

As described above, the capstan shaft 36 is moved in a forward or a backward direction through the ball screw 43 and the connection block 39 under a rotation of the servo motor 25. When the engaging or disengaging means is disengaged at the forwarded position shown in FIG. 11 and a servo motor 48 is rotated in the desired number of rotation, either one of two capstan rests 18 described below is indexed and positioned at the main shafts 2, and two capstan rests 18 are arranged at the extremity ends of the capstan shafts 36 through the fixing blocks 29 in such a way as described below.

That is, the capstan rests 18 of the second preferred embodiment, similar to that of the first preferred embodiment, are of a rectangular capstan in which the disk installed in it is driven to rotate by 1/6 of a rotation under a hydraulic oil fed by hydraulic lines 61 installed in the capstan shafts 36, and two capstan rotary axes R are arranged to cross at a right angle with the axes of the capstan shafts 36 at symmetrical positions around the capstan shafts 36 at both sides of the fixing blocks 29.

Although, in the embodiment above, two capstan rests 18 are arranged with the fixing blocks 29 of rectangular parallelepiped, the fixing blocks 29 may be of another polygon, more than three capstan rests may be mounted at the extremity ends of the capstan shafts 36, the capstan shafts 36 may only be slid in a longitudinal direction similar to the case in which the slide shafts 19 in the first preferred embodiment are applied, and the fixing blocks 29 for the capstan rests 18 may be driven to rotate in respect to the capstan shafts 36.

In the lathe constructed in accordance with the second preferred embodiment, the servo motors 9 are rotated in order to cause the capstan shafts 36 with the capstan rests 18 mounted thereon to be moved in a rightward or a leftward direction (a direction X shown in the figure), the cross slides 6 are moved in parallel. In order to cause the capstan shafts to be moved in a forward or a backward direction (a direction Z shown in the figure), the servo motors 25 on the cross slides 6 are rotated. In order to index each of the capstan rests 18, a hydraulic oil is fed to the capstans. Each of the capstan rests 18 mounted at the extremity ends of the capstan shafts 36 is made similar to that of the first preferred embodiment in such a way as its diameter is substantially small compared with that of the prior art in which a radius of the capstan should have a large diameter that is substantially equal to a distance L between the shafts 36, 2 when at least the capstan shafts 36 and the main shafts 2 are most closely approached to each other, so that an indexing speed of each of the capstans is made fast. Since a plurality of capstans are fixed on the fixing blocks 29 irrespective of a small diameter of each of the capstans, several tool fixing surfaces can be provided for each of the capstan shafts 36, the number of tools which can be fixed is not decreased, and an arrangement in which the fixing blocks are of a polygon as described above and many capstan rests are installed on one capstan shaft 36 enables the number of tools which can be fixed to be increased.

In the lathe constructed in accordance with the preferred embodiments in which similar capstan rests 18 mounted on the fixing blocks 29 are arranged at symmetrical positions in respect to the capstan shafts 36, a low moment of inertia is applied to the capstan shaft 36 and a smooth and fast rotation of the capstan shafts 36 can be provided.

What is claimed is:

1. A lathe comprising a lathe bed in which a head stock for receiving at least one main shaft is located at a central portion of said lathe bed, said head stock having two bores provided below said main shaft, said lathe further having supporting members fixed at left and right sides of said lathe bed, respectively, said lathe further having two cylindrical guide shafts, aligned in parallel along a horizontal plane, said guide shafts extending from one of said sides of said lathe through said bores to the other said side of said lathe;

said cylindrical guide shafts having end portions affixed to said supporting members;

said lathe further having an adjusting means for simultaneously and precisely aligning said cylindrical guide shafts affixed to said supporting members;

said lathe further having cross slides, said cross slides being located at said left and right sides of said lathe respectively, between said head stock and said supporting members, said cross slides being slideable laterally with respect to said main shaft along said precisely aligned guide shafts;

said cross slides having both a cylindrical guide shaft and a slide shaft which are both in parallel, said guide shaft and slide shaft crossing at a right angle with said precisely aligned guide shafts;

said slide shaft being moveable longitudinally with respect to said main shaft, said slide shaft having a mounting block fixed at an extremity end; and said mounting block having a tool rest fixed at one end so that said tool rest is positioned laterally with respect to said slide shaft.

2. A lathe as set forth in claim 1 characterized in that said tool rest located at said end of said mounting blocks is of the capstan rest type and the rotating axis of said capstan rest is crossed with the axis of said slide shaft.

3. A lathe as set forth in claim 2 characterized in that a plurality of capstan rests are mounted on the end of said slide shaft.

4. A lathe as set forth in claim 1 characterized in that said supporting members for supporting said cylindrical guide shafts are positionally adjusted with respect to the lathe bed.

5. A lathe as set forth in claim 1 characterized in that said head stock for said main shaft is integrally formed with said lathe bed.

6. A lathe comprising a lathe bed in which a head stock for receiving at least one main shaft is located at a central portion of said lathe bed, said head stock having two bores provided below said main shaft, said lathe further having supporting members fixed at left and right sides of said lathe bed, respectively, said lathe further having two cylindrical guide shafts, aligned in parallel along a horizontal plane, said guide shafts extending from one of said sides of said lathe through said bores to the other said side of said lathe;

said cylindrical guide shafts having end portions affixed to said supporting members;

said lathe further having an adjusting means for simultaneously and precisely aligning said cylindrical guide shafts affixed to said supporting members;

said lathe further having cross slides, said cross slides being located at said left and right sides of said lathe respectively, between said head stock and said supporting members, said cross slides being slideable laterally with respect to said main shaft along said precisely aligned guide shafts;

said cross slides having both a cylindrical guide shaft and a slide shaft which are both in parallel, said guide shaft and slide shaft crossing at a right angle with said precisely aligned guide shafts;

said slide shaft being moveable longitudinally with respect to said main shaft, said slide shaft having a tool rest fixed at an extremity end.

* * * * *